United States Patent
Koren et al.

(10) Patent No.: US 7,275,014 B1
(45) Date of Patent: Sep. 25, 2007

(54) DISTRIBUTED GRAPH LAYOUT FOR SENSOR NODE NETWORKS

(75) Inventors: Yehuda Koren, Elizabeth, NJ (US); Craig Gotsman, Brookline, MA (US)

(73) Assignee: AT&T Corporation, Bedminister, NJ (US)

(*) Notice: Subject to any disclaimer, the term of this patent is extended or adjusted under 35 U.S.C. 154(b) by 319 days.

(21) Appl. No.: 11/055,261

(22) Filed: Feb. 10, 2005

(51) Int. Cl.
*G06F 15/00* (2006.01)

(52) U.S. Cl. .............. 702/150; 702/158; 702/189; 701/214

(58) Field of Classification Search ............... 702/155, 702/158, 188–190, 150; 709/223–225; 701/213–216, 701/300
See application file for complete search history.

(56) References Cited

U.S. PATENT DOCUMENTS

| | | | |
|---|---|---|---|
| 6,522,284 B2 * | 2/2003 | Miceli et al. | 342/22 |
| 6,853,913 B2 * | 2/2005 | Cherveny et al. | 701/208 |
| 6,992,625 B1 * | 1/2006 | Krumm et al. | 342/451 |
| 7,026,937 B2 * | 4/2006 | Przygoda, Jr. | 340/572.4 |
| 7,050,955 B1 * | 5/2006 | Carmel et al. | 703/6 |
| 7,091,902 B2 * | 8/2006 | Liu et al. | 342/174 |
| 2003/0012168 A1 * | 1/2003 | Elson et al. | 370/338 |

* cited by examiner

*Primary Examiner*—Eliseo Ramos-Feliciano
*Assistant Examiner*—Mary Catherine Baran
(74) *Attorney, Agent, or Firm*—Michael Haynes PLC; Michael N. Haynes; Dale R. Jensen

(57) ABSTRACT

Certain exemplary embodiments comprise a method, comprising: in a sensor node network comprising a plurality of sensor nodes, each sensor node from the plurality of sensor nodes having location coordinates that are initially unknown, each sensor node from the plurality of sensor nodes having neighbors, each sensor node from the plurality of sensor nodes capable of determining distances only to that sensor node's neighbors: for each sensor node from the plurality of sensor nodes, communicating with that sensor node's neighbors; and based only on communications between neighbors, in a fully distributed manner, generating a sensor node network layout that indicates the location coordinates of each sensor node.

20 Claims, 4 Drawing Sheets original placement     eigen-projection initialization ⟹ stress minimization

3000

DISTRIBUTED GRAPH LAYOUT FOR SENSOR NODE NETWORKS

BACKGROUND

Sensor node network applications can benefit from the sensor nodes knowing their physical locations in some global coordinate system. This can be achieved by equipping each sensor node with a location measurement device, such as GPS. However, low-end systems or indoor systems, which typically cannot use GPS, can typically locate themselves based only on crude information available locally, such as inter-sensor node distances.

BRIEF DESCRIPTION OF THE DRAWINGS

A wide variety of potential embodiments will be more readily understood through the following detailed description of certain exemplary embodiments, with reference to the accompanying exemplary drawings in which.

DETAILED DESCRIPTION

Figure 1:
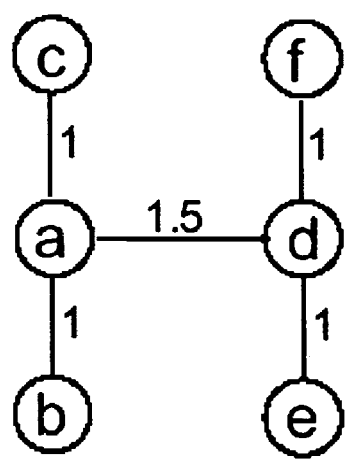
FIG. 1 is a exemplary layout 1000 of an exemplary graph.

Sensor node network applications can benefit from the sensor nodes knowing their physical locations in some global coordinate system. This can be achieved by equipping each sensor node with a location measurement device, such as GPS. However, low-end systems or indoor systems, which typically cannot use GPS, can typically locate themselves based only on crude information available locally, such as inter-sensor node distances. Herein is shown how a collection of sensor nodes, capable only of measuring distances to neighbors, can compute their locations in a purely distributed manner, i.e., where each sensor node communicates only with its neighbors. This can be viewed as a distributed graph drawing algorithm. We experimentally show that our algorithm consistently produces good results under a variety of simulated real-world conditions.

1—INTRODUCTION

Sensor node networks can be viewed as a collection of (usually miniature) devices, each with limited computing and (typically wireless) communication capabilities, distributed over a physical area. The network can collect data from its environment, integrate the collected data, and/or answer queries related to this data. Sensor node networks are becoming more and more attractive in environmental, military, and ecological applications (see [11] for a survey of this topic).

The advent of sensor node networks has presented a number of research challenges to the networking and distributed computation communities. Since each sensor node can typically communicate only with a small number of other sensor nodes, information generated at one sensor node can reach another sensor node only by routing it through the network, whose connectivity is described by a graph. This typically requires ad-hoc routing algorithms, especially if the sensor nodes are dynamic. Traditional routing algorithms relied only on the connectivity graph of the network, but with the introduction of so-called location-aware sensor nodes, namely, those who also know what their physical location is, e.g. by being equipped with a GPS receiver, this information can be used to perform more efficient geographic routing. See [9] for a survey of these routing techniques.

Beyond routing applications, location-aware sensor nodes can be important for information dissemination protocols and/or query processing. Location awareness can be achieved primarily by equipping the sensor nodes with GPS receivers. These, however, might be too expensive, too large, or too power-intense for the desired application. In indoor environments, GPS typically does not work well or at all (due to the lack of line-of-sight to the satellites), so alternative solutions typically must be employed. Luckily, sensor nodes are usually capable of other, more primitive, geometric measurements, which can aid in this process. An example of such a geometric measurement is the distance to neighboring sensor nodes. This measurement can be achieved either by Received Signal Strength Indicator (RSSI) or Time of Arrival (ToA) techniques. An important question is then whether it is possible to design a protocol by which each sensor node can use this local information to (iteratively) compute its location in some global coordinate system.

Provided herein is a solution to the following sensor node layout problem: Given a set of sensor nodes with unknown location coordinates, and a mechanism by which a sensor node can estimate its distance to at least a few nearby sensor nodes, determine the coordinates of every sensor node in the set via local sensor node-to-sensor node communication. These coordinates are called a layout of the sensor node network.

As stated, this problem can be viewed as not particularly well-defined, because it typically will not have a unique solution. A unique solution would mean that the system is rigid, in the sense that no individual sensor node can be moved without changing at least one of the known distances. When all $$\binom{n}{2}$$

inter-sensor node distances are known, the solution is indeed unique, and is traditionally solved using the Classical Multidimensional Scaling (MDS) technique [1]. When only a subset of the distances are known, more sophisticated techniques must be used.

When multiple solutions exist, the main phenomenon typically observed in the solutions is that of foldovers, where entire pieces of the graph fold over on top of others, without violating any of the distance constraints. Thus, a significant challenge is to generate a solution which is fold-free. The result will have translation, orientation, and/or reflection degrees of freedom, but either these are not important, or can be resolved by assigning some known coordinates to three sensor nodes.

In order to be easily and/or reliably implemented on a sensor node network, the solution to this sensor node network layout problem can be fully distributed (decentralized). This means that each sensor node can compute based on information available only at that sensor node and its immediate neighbors. The class of neighbors is typically characterized by a probabilistic variant of the disk graph: Any sensor node within distance $R_1$ is reachable, any sensor node beyond distance $R_2$ is not reachable, and any sensor node at a distance between $R_1$ and $R_2$ is reachable with probability p. Information from one sensor node might eventually propagate through the network to any other sensor node, but this need not be done explicitly.

2—RELATED WORK

In addition to the applications described and/or referenced herein, the problem of reconstructing a geometric graph given its edge-lengths can be relevant for molecule construction and protein folding applications. Deciding whether a given graph equipped with edge lengths admits a unique layout realizing the given edge lengths is in general NP-hard [13]. This does not change even if a layout is known to exist (as in our case). Interestingly enough, for the dense class of graphs known as generic graphs, it is possible to determine the uniqueness of a layout in polynomial time [6]. However, no polynomial time algorithm is known to compute the layout.

The problem of distributed layout of a sensor node network has received some attention in the sensor node network community. A recent work of Priyantha et al [10] classifies these into anchor-based vs. anchor-free algorithms and incremental vs. concurrent algorithms. Anchor-based algorithms rely on the fact that a subset of the sensor nodes are already aware of their locations, and the locations of the others are computed based on those. In practice a large number of anchor sensor nodes can be required for the resulting location errors to be acceptable. Incremental algorithms start with a small core of sensor nodes that are assigned coordinates. Other sensor nodes are repeatedly added to this set by local trigonometric calculations. These algorithms can accumulate errors and cannot escape local minima once they are entered. Concurrent algorithms are what we called distributed algorithms, and can work in parallel on all sensor nodes. They are better able to avoid local minima and avoid error accumulation. Priyantha et al [10] review a number of published algorithms and their classifications. All of them, however, are not fully distributed.

The algorithm we shall describe can be viewed as having some similarity in spirit to the so-called Anchor-Free Localization (AFL) algorithm proposed by Priyantha et al [10]. The AFL algorithm operates in two stages. In the first stage a heuristic is applied to generate a well-spread fold-free graph layout which "looks similar" to the desired layout. The second stage uses a mass-spring optimization to correct and balance local errors, converging to the final result. The heuristic used in the first stage involves the election of five reference sensor nodes. Four of these sensor nodes are well-distributed on the periphery of the network, and serve as north, east, south and west poles. A fifth reference sensor node is chosen at the center. Coordinates are then assigned to all sensor nodes, using these five sensor nodes, reflecting their assumed positions. Unfortunately, all this process is far from distributed. The second stage of the algorithm attempts to minimize the partial stress energy using a gradient descent technique. At each sensor node, the coordinates are updated by moving an infinitesimal distance in the direction of the spring force operating on the sensor node. This is a fully distributed protocol. It, however, involves a heuristic choice of the infinitesimal step, and can be quite slow.

Our algorithm also can involve two stages with somewhat similar objectives. The first can generate a fold-free layout. This can be done based on a distributed eigenvector computation which typically spreads the sensor nodes well. The second stage can use the result of the first stage as an initial layout for an iterative stress-minimization algorithm. As opposed to Priyantha et al [10], it is not based on gradient descent, rather on a more effective majorization technique.

Once again we emphasize that a main challenge can be to design algorithms which are fully distributed. This can be a major concern in sensor node network applications, and there is an increasing interest in designing such solutions. These turn out sometimes to be quite non-trivial. Probably the simplest example is a distributed algorithm to compute the sum (or average) of values distributed across the network. See [12] for a discussion of this.

3—THE PROBLEM

Given a graph $G(V=\{1, \ldots, n\}, E)$, and for each edge $<i,j>$— its Euclidean length $l_{ij}$, denote a 2D layout of the graph by x, $y \in \Re^n$, where the coordinates of sensor node i are $(x_i, y_i)$, and $d_{ij} = \sqrt{(x_i - x_j)^2 + (y_i - y_j)^2}$.

Because the sensor nodes do or will physically exist, we know that there exists a layout of the sensor nodes that realizes the given edge lengths. One goal can be to reproduce this layout. This layout is usually not unique. For example consider a 2n×2n square grid, where each internal sensor node is connected to its four immediate neighbors with an edge of length one. We can realize all lengths using the degenerate 1D layout where half of the sensor nodes are placed on 0 and the other half is placed on 1. Specifically, given a sensor node with grid coordinates (r, c), we place it on point 0 if r+c is even, otherwise, we place it on point 1.

Fortunately, there is additional information that we may exploit to eliminate spurious solutions to the layout problem—we know that the graph is a full description of the close sensor nodes. Consequently, the distance between each two nonadjacent sensor nodes should be greater than some constant r, which is larger than the longest edge. This can further constrain the search space and eliminate most undesired solutions. Formally, we may pose our problem as follows:

Layout problem: Given a graph $G(\{1, \ldots, n\}, E)$, and for each edge $<i,j>$— its length $l_{ij}$, find an optimal layout $(p_1, \ldots, p_n)$ ($p_i \in \Re^d$ is the location of sensor node i), which satisfies for all $i \neq j$:

$$\begin{cases} \|p_i - p_j\| = l_{ij} & \text{if } \langle i, j \rangle \in E \\ \|p_i - p_j\| > r & \text{if } \langle i, j \rangle \notin E \end{cases}$$

Here, $r = \max_{<i,j> \in E} l_{ij}$. For the rest of this discussion, we assume d=2.

Figure 2:
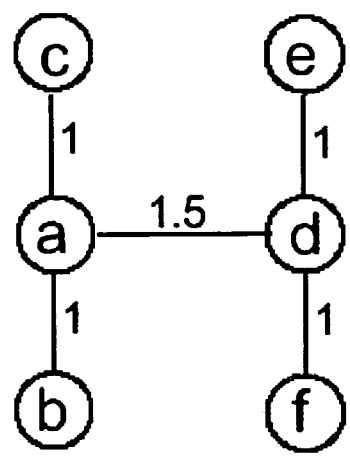
FIG. 2 is an alternative exemplary layout 2000 of the exemplary graph of FIG. 1.

It seems that an optimal layout is unique (up to translation, rotation, and reflection) in many practical situations. For example, it overcomes the problem in the 2n×2n grid example described above. However, there are graphs for which an optimal layout is not unique. For example, consider the 6-sensor node graph shown in FIGS. 1 and 2, which show two different optimal layouts, 1000 and 2000, respectively.

An optimal layout is similar to that generated by common force-directed graph drawing algorithms that place adjacent sensor nodes closely while separating nonadjacent sensor nodes. Therefore, we may exploit some known graph drawing techniques. For example, separating nonadjacent sensor nodes can be achieved by solving an electric-spring system with repulsive forces between these sensor nodes [2,3]. Another possibility is to somehow estimate the distances $l_{ij}$ between nonadjacent sensor nodes (e.g., as the graph-theoretic distance) and then to minimize the full stress energy:

$$\sum_{i<j} \frac{(d_{ij} - l_{ij})^2}{l_{ij}^2};$$

using an MDS-type technique; see [7].

However, since we aim at a distributed algorithm which should minimize communication between the sensor nodes, dealing with repulsive forces or long-range target distances is not practical, as this will involve excessive inter-sensor node interaction, which is very expensive in this scenario. To avoid this, we propose an algorithm which is based only on direct information sharing between adjacent sensor nodes, avoiding all communication between nonadjacent sensor nodes or any centralized supervision. Note that such a restriction rules out all common algorithms for general graph drawing problem; we are not aware of any layout algorithm that satisfies it. But our case may be easier for two reasons. First, we deal with geometric graphs which are usually well structured and easier to draw. Second, we are guaranteed the existence of an optimal layout.

4—SMART INITIALIZATION AND EIGEN-PROJECTION

A useful energy function which is minimized by the desired layout is the localized stress energy:

$$Stress(x, y) = \sum_{\langle i,j \rangle \in E} (d_{ij} - l_{ij})^2;$$

where $d_{ij} = \sqrt{(x_i - x_j)^2 + (y_i - y_j)^2}$. Since we are guaranteed the existence of a layout where $d_{ij} = l_{ij}$, it is reasonable to hope that if we start minimizing the localized stress energy with a "smart" initial layout, the process will converge to a local minimum that is actually the right solution. To construct such an initial layout, we exploit the fact that nonadjacent sensor nodes should be placed further apart. This means that we seek a layout that spreads the sensor nodes well. We first deal with the one-dimensional case. We will design an energy function which is minimized by such a layout, and can be optimized in a strictly distributed fashion.

The function is defined as follows:

$$E(x) = \frac{\sum_{\langle i,j \rangle \in E} w_{ij} \|x_i - x_j\|^2}{\sum_{i<j} \|x_i - x_j\|^2} \quad (2)$$

Here, $w_{ij}$ is some measure for the similarity of the adjacent sensor nodes i and j. It should be derived from $l_{ij}$, e.g., $w_{ij} = 1/(l_{ij} + \alpha)$ or $w_{ij} = \exp(-\alpha l_{ij}), \alpha \geq 0$; in our experiments we used $w_{ij} = \exp l_{ij}$). Minimizing E(x) is useful since it tries to locate adjacent sensor nodes close to each other while separating nonadjacent sensor nodes. It can also be solved fairly easily. Denote by D the diagonal matrix whose i'th diagonal entry is the sum of the i'th row of W: $D_{ii} = \Sigma_{j:\langle i,j \rangle \in E} w_{ij}$. The global minimum of E(x) is the eigenvector of the related weighted Laplacian matrix $L^w = D - W$ associated with the smallest positive eigenvalue; see [5,8]. In practice, it is better to work with the closely related eigenvectors of the transition matrix $D^{-1} W$, which have some advantages over the eigenvectors of $L^w$; see [8]. Note that the top eigenvalue of $D^{-1} W$ is $\lambda_1 = 1$, associated with the constant eigenvector $v_1 = 1_n = (1, 1, \ldots, 1)$, so the optimal solution is actually the second eigenvector $v_2$.

The vector $v_2$ can be computed in a distributed manner by iteratively averaging $$x_i \leftarrow a \left( x_i + \frac{\sum_{\langle i,j \rangle \in E} w_{ij} x_j}{\sum_{\langle i,j \rangle \in E} w_{ij}} \right) \quad (3)$$

the value at each sensor node with the values of its neighbors:

Readers familiar with numerical linear algebra will recognize this process as power iteration of the matrix $I + D^{-1} W$. Power iteration converges to the eigenvector of the iterated matrix corresponding to the eigenvalue with highest absolute value. Here we initialize the process by a vector y which is D-orthogonal to $v_1$, namely $y^T D v_1 = 0$, using a distributed method that will be described shortly. Hence, the process will converge to $v_2$—the next highest eigenvector of $I + D^{-1} W$ (or, equivalently $D^{-1} W$); see [8]. D-orthogonality, rather than simple orthogonality, is required because $D^{-1} W$ is not symmetric. The constant a>0 controls the growth of $\|x\|$; in our implementation we picked a=0.51.

4.1—Two Dimensional Layout

We now turn our attention to the two-dimensional layout problem. E(x) is defined also in higher dimensions (where x is short for (x, y)), and a "smart" initial 2D layout is achieved by taking the x coordinate to be $v_2$—the second eigenvector of $D^{-1} W$, and they coordinate to be $v_3$—the third eigenvector of $D^{-1} W$. Unfortunately, the power iteration (3) will not detect $v_3$, as it is dominated by $v_2$, unless we start the process (3) with a vector D-orthogonal to $x = v_2$.

Constrained by the distributed computation requirement, it is not easy to initialize the process with a vector D-orthogonal to $v_2$. We resort to the following lemma:

Lemma 1. Given two vectors x and y and matrices D and A, the vector Ay is D-orthogonal to x if $A^T D x = 0$.

Proof Since $A^T D x = 0$, then $y^T A^T D x = 0$. Equivalently $(Ay)^T D x = 0$ and the lemma follows.

Therefore, it suffices to construct a "local matrix" A such that $A^T D x = 0$. By "local" we mean that $A_{i,j} \neq 0$ only if $\langle i,j \rangle \in E$. This will enable a distributed computation. In our case when D is diagonal, a suitable matrix is the following:

$$A_{i,j} = \begin{cases} -x_i/D_{ii} & \langle i,j \rangle \in E \\ 0 & \langle i,j \rangle \notin E, i \neq j \ i, j = 1, \ldots, n \\ -\sum_k A_{i,k} & i = j \end{cases}$$

It is easy to verify that $A^T Dx = 0$.

To summarize, to obtain $y = v_3$, we pick some random vector $u$, and initialize $y$ with $Au$. Note that the computation of $Au$ involves only local operations, and can be easily distributed. Then, we run the power iteration (3) on vector $y$.

Eliminating the $v_1$ Component

Note that the initial vector is D-orthogonal to $v_2$ but not necessarily D-orthogonal to $v_1 = 1_n$. Hence, after many iterations, the result will be $y = \alpha v_1 + \epsilon v_3$, for some very small $\epsilon$. While the process ultimately converges to what seems to be an essentially useless vector, its values near the limit is what is interesting. Since $v_1$ is the constant vector $-1_n$, these values are essentially a scaled version of $v_3$ displaced by some fixed value ($\alpha$) and they still retain the crucial information we need.

However when the numerical precision is low and the ratio $\alpha/\epsilon$ is too high we might lose the $v_3$ component. Fortunately, we can get around this by translating and scaling $y$ during the power iteration. Specifically, every $\beta n$ iterations (we use $\beta = 1/2$) compute $\min_i y_i$ and $\max_i y_i$. A distributed computation is straightforward and can be completed with number of iterations bounded by the diameter of the graph (at most $n-1$). Then, linearly transform $y$ by setting $$y_i \leftarrow \frac{y_i - \min_i y_i}{\max_i y_i - \min_i y_i} - \frac{1}{2}, \quad i = 1, \ldots, n \quad (4)$$

After this, $\min_i y_i = -0.5$ and $\max_i y_i = 0.5$. Since translation is equivalent to addition of $\gamma v_1$ and scaling cannot change direction, we can still express $y$ as $\hat{\alpha} v_1 + \hat{\epsilon} v_3$.

Now assume, without loss of generality, that $\max_i v_3 - \min_i v_3 = 1$, and recall that $v_1 = (1, 1, \ldots, 1)$. The D-orthogonality of $v_3$ to $1_n$ implies: $\max_i v_3 > 0$ and $\min_i v_3 < 0$. In turn, $\min_i y_i = -0.5$ and $\max_i y_i = 0.5$ imply that $|\hat{\alpha}| < 0.5$. Moreover, since all the variability of $y$ is due to its $v_3$ component, we get $\hat{\epsilon} = 1$. Therefore, (4) guarantees that the magnitude of the $v_3$ component is larger than that of the $v_1$ component, avoiding potential numerical problems.

4.2—Balancing the Axes

The process described in Section 4.1 can yield $x$ and $y$ coordinates at very different scales. Usually, we require that $\|x\| = \|y\|$, but this is difficult to achieve in a distributed manner. An easier alternative that is more suitable for a distributed computation is a balanced aspect ratio, i.e.:

$$\max_i x_i - \min_i x_i = \max_i y_i - \min_i y_i$$

Since the computation of the y-coordinates already achieved $\max_i y_i - \min_i y_i = 1$, it remains to ensure that the x coordinates have the same property. We achieve this by performing:

$$x_i \leftarrow \frac{x_i}{\max_i x_i - \min_i x_i}, \quad i = 1, \ldots, n \quad (5)$$

Note that we only scale the x-coordinates and do not translate them, because translation involves the $v_1$ component that is not part of the x-coordinates.

In fact, it might be beneficial to scale $x$ by (5) a few times during the power iteration (3). This can prevent potential numerical problems when the coordinates are extremely large (overflow) or small (underflow).

5—OPTIMIZING THE LOCALIZED STRESS ENERGY

At this point we have reasonable initial locations for both the x- and y-coordinates, and are ready to apply a more accurate 2D optimization process for minimizing the localized stress. A candidate could be simple gradient descent, which is easily distributed, as in [10]. Each sensor node would update its x-coordinates as follows:

$$x_i(t+1) = x_i(t) + \delta \sum_{j:\langle i,j \rangle \in E} \frac{(x_j(t) - x_i(t))}{d_{ij}(t)} (d_{ij}(t) - l_{ij}), \quad (6)$$

where $d_{ij}(t) = \sqrt{(x_i(t) - x_j(t))^2 + (y_i(t) - y_j(t))^2}$. The y-coordinates are handled similarly. This involves a scalar quantity $\delta$ whose optimal value is difficult to estimate. Usually a conservative value is used, but this slows down the convergence significantly.

A more severe problem of this gradient descent approach is its sensitivity to the scale of the initial layout. The minimum of $E(x)$ is scale-invariant, since $E(cx) = E(x)$ for $c \neq 0$. However, the minimum of Stress(x) is certainly not scale-invariant as we are given specific target edge lengths. Therefore before applying gradient descent we have to scale the minimum of $E(x)$ appropriately.

Fortunately, we can avoid the scale problem by using a different approach called majorization. Besides being insensitive to the original scale, it is usually more robust and avoids having to fix a $\delta$ for the step size. For a detailed description of this technique, we refer the interested reader to multidimensional scaling textbooks, e.g., [1]. Here we provide just a brief description.

Using the Cauchy-Schwartz inequality we can bound the localized 2D stress of a layout (x, y) by another expression of (x, y) and (a, b), as follows:

$$\text{Stress}(x,y) \leq x^T L x + y^T L y + x^T L^{(a,b)} a + y^T L^{(a,b)} b + c, x, y, a, b \in R^n, \quad (7)$$

with equality when $x = a$ and $y = b$. Here, $c$ is a constant independent of $x, y, a, b$. $L$ is the graph's unweighted $n \times n$ Laplacian matrix (also independent of $x, y, a, b$) defined as:

$$L_{i,j} = \begin{cases} -1 & \langle i,j \rangle \in E \\ 0 & \langle i,j \rangle \notin E \quad i, j = 1, \ldots, n \\ -\sum_{j \neq i} L_{i,j} & i = j \end{cases}$$

The weighted Laplacian n×n matrix $L^{a,b}$ is defined as:

$$L_{i,j}^{(a,b)} = \begin{cases} l_{ij} \cdot inv\left(\sqrt{(a_i-a_j)^2 + (b_i-b_j)^2}\right) & \langle i,j \rangle \in E \\ 0 & \langle i,j \rangle \notin E \quad i,j=1,\ldots,n \\ \sum_{j \neq i} L_{i,j}^{(a,b)} & i=j \end{cases}$$

where $$inv(x) = \begin{cases} 1/xx \neq 0 \\ 0 \quad x = 0 \end{cases}$$

Note the special treatment that the inv function gives to the zero value. Given a layout a, b, we can find another layout (x, y) which minimizes the r.h.s. $x^T Lx + y^T Ly + x^T L^{a,b}a + y^T L^{a,b}b + c$ by solving the linear equations:

$$Lx = L^{(a,b)}a$$

$$Ly = L^{(a,b)}b$$

Using inequality (7) we are guaranteed that the stress of the layout has decreased when going from (a, b) to (x, y), i.e., Stress(x, y) ≦ Stress(a, b). This induces an iterative process for minimizing the localized stress. At each iteration, we compute a new layout (x(t+1), y(t+1)) by solving the following linear system:

$$L \cdot x(t+1) = L^{(x(t),y(t))} \cdot x(t)$$

$$L \cdot y(t+1) = L^{(x(t),y(t))} \cdot y(t) \qquad (8)$$

Note that the matrix L is semi positive-definite. Without loss of generality we can fix the location of one of the sensor nodes (utilizing the translation degree of freedom of the localized stress) and obtain a strictly diagonally dominant matrix. Therefore, we can safely use Jacobi iteration [4] for solving (8), which is easily performed in a distributed manner as follows.

Assume we are given a layout (x(t), y(t)) and want to compute a better layout (x(t+1), y(t+1)) by a single iteration of (8). Then we iteratively perform for each i=1, ..., n:

$$x_i \leftarrow \frac{1}{deg_i} \sum_{j:\langle i,j \rangle \in E} (x_j + l_{ij}(x_i(t) - x_j(t))inv(d_{ij}(t))) \qquad (9)$$

$$y_i \leftarrow \frac{1}{deg_i} \sum_{j:\langle i,j \rangle \in E} (y_j + l_{ij}(y_i(t) - y_j(t))inv(d_{ij}(t)))$$

Note that x(t), y(t) and d(t) are constants in this process which converges to (x(t+1), y(t+1)). Interestingly, when deriving (x(t+1), y(t+1)) only the angles between sensor nodes in (x(t), y(t)) are used. Therefore, this process is independent of the scale of the current layout.

It is possible to simplify the 2D majorization process somewhat. When the iterative process (9) converges the layout scale issue is resolved. Hence, instead of continuing with another application of (8) to obtain a newer layout, it is possible to resort to a faster local process (which, in contrast, is scale-dependent). In this process each sensor node uses a local version of the energy where all other sensor nodes are fixed. By the same majorization argument the localized stress decreases when applying the following iterative process:

$$x_i \leftarrow \frac{1}{deg_i} \sum_{j:\langle i,j \rangle \in E} (x_j + l_{ij}(x_i - x_j)inv(d_{ij})) \qquad (10)$$

$$y_i \leftarrow \frac{1}{deg_i} \sum_{j:\langle i,j \rangle \in E} (y_j + l_{ij}(y_i - y_j)inv(d_{ij}))$$

Here, as usual $d_{ij} = \sqrt{(x_i-x_j)^2 + (y_i-y_j)^2}$. This process is similar to (9), except that $x_i$, $x_j$ and $d_{ij}$ are no longer constants. We have used this in our implementation, and it seems to accelerate the convergence. Note that this is somewhat close to the gradient descent (6) when using $\delta = 1/deg_i$, a different step size per sensor node.

6—EXPERIMENTAL RESULTS

We have implemented our algorithm and the AFL algorithm [10], and compared their performance on a variety of inputs. In the first experiment, we construct a family of graphs containing 1000 sensor nodes distributed uniformly in a 10×10 square. Each two sensor nodes are connected if they are in range R, where we used R=0.5, 0.6, 0.7, 0.8, 0.9, 1. If the graph is disconnected, the largest connected component was taken. We measure the sensitivity of the algorithm to noise controlled by the fractional range measurement error parameter £m. The distances fed as input to our algorithm are the true distances $l_{ij}$, to which uniformly distributed random noise in the range $[-\sigma l_{ij}, +\sigma l_{ij}]$ is added; $\sigma$=0, 0.05, 0.1, 0.25, 0.5. Consequently, each graph in this family is characterized by the values of R and $\sigma$. For each pair (R, $\sigma$) we generated 30 corresponding random graphs. Some properties of these graphs are displayed in Table 1.

TABLE 1

Average (over 30 experiments) properties of largest connected components of graphs obtained by distributing 1000 sensor nodes in a 10 × 10 square, using different values of R.

| R | size | avg degree | max degree | min degree |
|---|------|------------|------------|------------|
| 0.5 | 993 | 7 | 17.2 | 1 |
| 0.6 | 999.5 | 10 | 22 | 1.4 |
| 0.7 | 1000 | 14 | 27.5 | 2.4 |
| 0.8 | 1000 | 18.2 | 33.5 | 3.7 |
| 0.9 | 1000 | 23 | 40 | 5.1 |
| 1.0 | 1000 | 28.4 | 47.1 | 6.7 |

It seems that a key to successful results is a good initial layout from which the stress minimization routine can start. To compare the performance of our algorithm to that of the AFL algorithm and a more naive method, we ran three different initialization methods on each input followed by the same stress minimization algorithm: (1) Stress majorization with random initialization (RND). (2) Stress majorization with AFL initialization (AFL). (3) Stress majorization with eigen-projection initialization (EIGEN). For each method the quality of the final solution is measured by its Average Relative Deviation (ARD), which measures the accuracy of all pairwise distances:

$$ARD = \frac{2}{n(n-1)} \sum_{i<j} \frac{|d_{ij} - l_{ij}|}{\min(l_{ij}, d_{ij})}$$

The results are summarized in Table 2, where each cell shows the average ARD of RND/AFL/EIGEN for 30 different graphs characterized by the same (R, σ) pair. For all graphs, EIGEN consistently outperformed RND and AFL by a significant margin, whereas AFL barely improved RND. As expected, performance of the algorithms is improved as graphs become denser revealing more information about the underlying geometry. Note, that the sparser graphs contain sensor nodes of degree smaller than 3, which are inherently non-rigid thereby preventing accurate recovery. We can also see that EIGEN is quite robust in the presence of noise and its performance only moderately deteriorate as σ grows.

Figure 3:
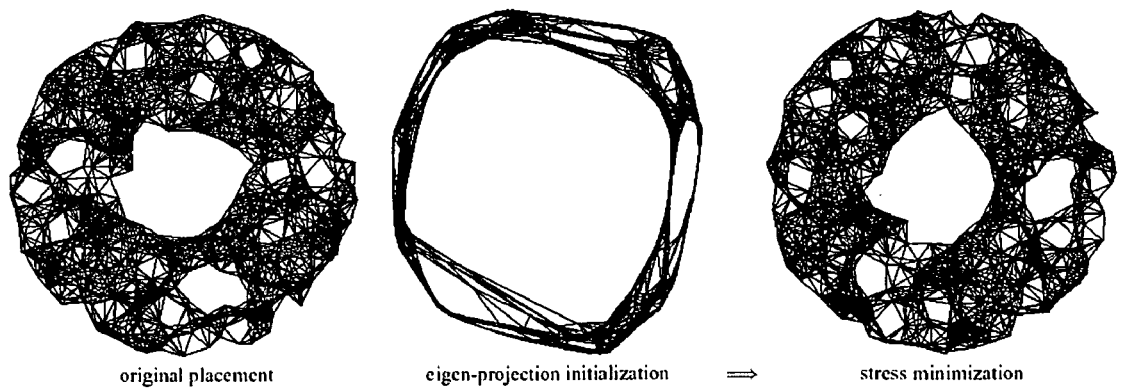
FIG. 3 is an illustration of an exemplary reconstruction of a graph 3000.

Also, FIG. 3 is an illustration comparing exemplary reconstructions of a graph 3000, which shows a typical result of EIGEN, before and after the stress majorization. In particular, FIG. 3 shows reconstructing a 715-sensor node disk-based proximity graph by localized stress majorization preceded by eigen-projection. Here R=0.8, σ=0.

We ran RND, AFL and EIGEN on these graphs and summarized the results in Table 4. The topology of the disk is different than that of the square, and it ended in a somewhat lower quality results for EIGEN and somewhat improved results for RND. However, all the observations from the square-based experiment still hold here.

TABLE 2

Average relative deviation of square-based proximity graphs with varying (R, σ) using RND/AFL/EIGEN. Each result is averaged over 30 graphs.

| | σ = 0 | | | σ = 0.05 | | | σ = 0.1 | | | σ = 0.25 | | | σ = 0.5 | | |
|---|---|---|---|---|---|---|---|---|---|---|---|---|---|---|---|
| | RND | AFL | EIGEN | RND | AFL | EIGEN | RND | AFL | EIGEN | RND | AFL | EIGEN | RND | AFL | EIGEN |
| R = 0.5 | 13.5 | 11.16 | 0.078 | 13 | 10.9 | 0.078 | 13.2 | 11.1 | 0.079 | 12.6 | 10.9 | 0.099 | 12.8 | 10.9 | 0.14 |
| R = 0.6 | 11.7 | 7.38 | 0.0099 | 11.7 | 7.47 | 0.011 | 11.6 | 8.12 | 0.015 | 11.5 | 7.54 | 0.031 | 10.9 | 7.9 | 0.118 |
| R = 0.7 | 10.1 | 5.77 | 0.0029 | 10.1 | 6.11 | 0.0048 | 9.81 | 6.01 | 0.0079 | 10.2 | 6.24 | 0.018 | 9.87 | 6.13 | 0.049 |
| R = 0.8 | 8.75 | 4.93 | 0.0018 | 9.04 | 4.89 | 0.0034 | 8.21 | 4.82 | 0.0059 | 8.86 | 4.81 | 0.015 | 8.45 | 5.09 | 0.033 |
| R = 0.9 | 7.40 | 4.27 | 0.001 | 7.56 | 4.05 | 0.0027 | 7.58 | 4.12 | 0.0052 | 7.36 | 4.31 | 0.013 | 7.50 | 4.20 | 0.028 |
| R = 1.0 | 6.61 | 3.58 | 0.0008 | 6.66 | 3.45 | 0.0025 | 6.63 | 3.46 | 0.0047 | 6.91 | 3.79 | 0.012 | 6.59 | 3.77 | 0.026 |

Figure 4:
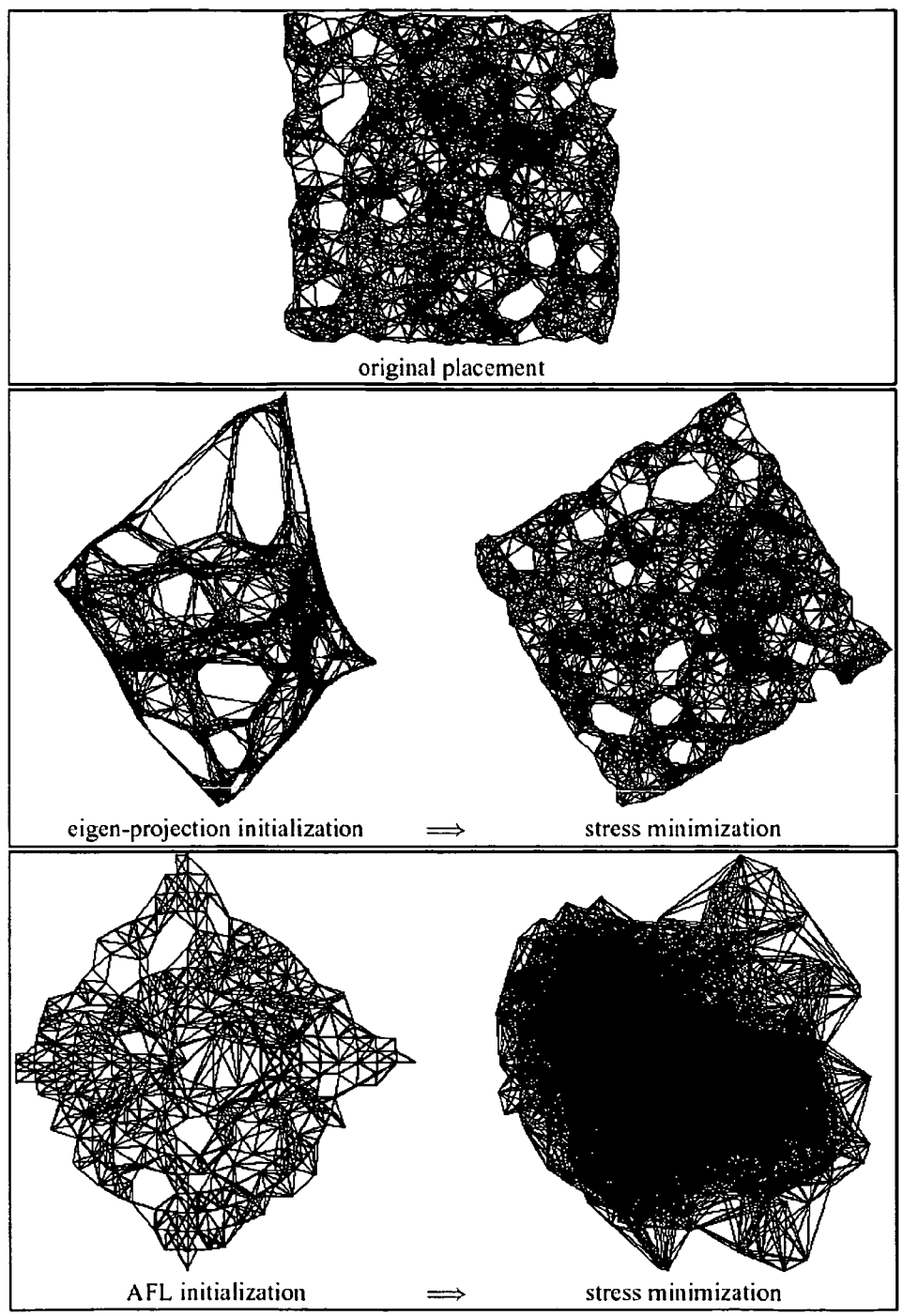
FIG. 4 is an illustration comparing exemplary reconstructions of a graph 4000.

FIG. 4 is an illustration of an exemplary reconstruction of a graph 4000 and showing typical results of AFL and EIGEN, before and after stress minimization. FIG. 4 shows reconstructing a 1000-sensor node proximity graph 4000 by localized stress majorization preceded by either eigen-projection or AFL; the superiority of eigen-projection is observable. Here R=0.8.

In another experiment, we worked with sensor nodes distributed uniformly on a perforated disk, with external radius 10 and internal radius 3. Note that the area of the disk is smaller than this of the 10×10 square, so we use now only 715 sensor nodes to retain the same density. Again, the graphs are characterized by the range and noise parameters (R, σ), and for each such a pair we generated 30 corresponding random graphs. The properties of these graphs are shown in Table

TABLE 3

Properties of largest connected component of graphs obtained by distributing 715 sensor nodes on a perforated disk with radii 3 and 10, using different values of R.

| R | size | avg degree | max degree | min degree |
|---|---|---|---|---|
| 0.5 | 710 | 7 | 16.9 | 1 |
| 0.6 | 714.6 | 10 | 21.4 | 1.5 |
| 0.7 | 715 | 13.6 | 27 | 2.5 |
| 0.8 | 715 | 17.6 | 32.5 | 4 |
| 0.9 | 715 | 22.1 | 39 | 6.1 |
| 1.0 | 715 | 27 | 45.6 | 8.2 |

TABLE 4

Average relative deviation of disk-based proximity graphs with varying (R, σ) using RND/AFL/EIGEN. Each result is averaged over 30 graphs.

| R | size | avg degree | max degree | min degree |
|---|---|---|---|---|
| 0.5 | 710 | 7 | 16.9 | 1 |
| 0.6 | 714.6 | 10 | 21.4 | 1.5 |
| 0.7 | 715 | 13.6 | 27 | 2.5 |
| 0.8 | 715 | 17.6 | 32.5 | 4 |
| 0.9 | 715 | 22.1 | 39 | 6.1 |
| 1.0 | 715 | 27 | 45.6 | 8.2 |

7—EXTENSIONS

There are a number of ways the basic algorithm can be extended:

7.1—Hybrid Method

It is possible to couple the stress optimization together with the eigen-projection in a single process. In such a process, we continuously perform a few local majorization iterations, where each sensor node is relocated according to process (10), followed by a single barycentric placement, where each sensor node is placed in the 2D barycenter of its neighbors.

The introduction of a few barycentric iterations during the majorization goes a long way towards preventing folding and convergence to local minima. Our recommendation is to start the process as a pure eigen-projection, then to continue with this hybrid method and to finish with a pure localized stress majorization.

7.2—Termination

A general concern in distributed systems is reaching agreement. In our application, this is relevant in reaching agreement when to terminate any particular iterative stage of the algorithm. It is easy for each sensor node to check whether it has converged, so each sensor node can terminate that way. However, transition to another phase of the algorithm that involves a different type of computation requires some sort of collective agreement on convergence. Currently, we just limit the maximal number of iterations (as a function of the number of sensor nodes). In some settings, it would be reasonable to allow the sensor nodes to perform an eternal process of stress minimization. When asked for their coordinates they should deliver the freshest result. This is especially suitable when sensor node locations are dynamic, so they should be continuously updating their estimated locations.

7.3—Numerical Stability

When computing the y-coordinates, the power iteration process (3) may occasionally lose its D-orthogonality to $x=v_2$, due to limited numerical precision. This can lead to high correlation between the x- and y-coordinates. Currently, we are using double precision arithmetic and our application will suffer from this problem when the graphs are pretty dense (average degree $\geq 30$). For such dense graphs the performance of the hybrid method is excellent and compensates for this deficiency of the power iteration. We believe that if the algorithm is implemented with extended numerical precision, one should not encounter such problems.

7.4—Working in Three Dimensions

When applying our eigen-projection method to 3D layouts, the z vector should be $v_4$—the fourth eigenvector of $I+D^{-1}W$. This means we must compute a vector z which is Dorthogonal to both x and y already computed. To achieve this, we partition the sensor nodes into disjoint sets, each of cardinality 3 at least. Possibly, some sensor nodes are left as singletons. In each set there should be a sensor node that is adjacent to all other sensor nodes of its set; let's call it the "center". This is a randomized max "star-matching" that can be performed in a distributed manner, using a few sweeps. Consider a set $\{i, j, k\}$, where i is the center. Now, i should know $x_i, y_i, D_{ji}, x_j, y_j, D_{jj}, x_k, y_k, D_{kk}$, which is possible since i can communicate with both j and k. Using this information, sensor node i computes a vector $(z_i, z_j, z_k)$ which is "D-orthogonal" to $(x_i, x_j, x_k)$, and $(y_i, y_j, y_k)$. By this we mean that $D_{ii}z_ix_i+D_{jj}z_jx_j+D_{kk}z_kx_k=0$, and also $D_{ii}z_iy_i+D_{jj}z_jy_j+D_{kk}z_ky_k=0$. This is done simply by a standard Gram-Schmidt process. Similarly, each center assigns the sensor nodes of its set their z-coordinates. Also, each sensor node i that was not assigned to a set takes $z_i=0$. This way we get an initial z which is D-orthogonal to x and y. Before computing this z, we should use the same technique to compute an exact $y=v_3$, which is D-orthogonal to both 1n and x.

8—CONCLUSION

We have presented an algorithm to generate sensor node network layouts in a fold-free manner based on short-range inter-sensor node distances. This algorithm is fully distributed (decentralized), and relies on no explicit communication other than that between neighbors. The fully distributed nature of the algorithm encourages practical implementations that avoids excessive communication. To the best of our knowledge, this is the first fully distributed algorithm for graph drawing or sensor node layout. Beyond this feature, judging from our experiments, our algorithm seems to be superior to the state-of-the-art in the sensor node network literature. Future work includes extension of our methods to dynamic sensor node networks and sensor node networks where more geometric information (such as angles) is available.

9—REFERENCES

The following references are cited herein in square brackets, e.g., [7]:

1. I. Borg and P. Groenen, *Modern Multidimensional Scaling: Theory and Applications*, Springer-Verlag, 1997.
2. P. Eades, "A Heuristic for Graph Drawing", *Congressus Numerantium* 42 (1984), 149-160.
3. T. M. G. Fruchterman and E. Reingold, "Graph Drawing by Force-Directed Placement", *Software—Practice and Experience* 21 (1991), 1129-1164.
4. G. H. Golub and C. F. Van Loan, *Matrix Computations*, Johns Hopkins University Press, 1996.
5. K. M. Hall, "An r-dimensional Quadratic Placement Algorithm", *Management Science* 17 (1970), 219-229.
6. B. Hendrickson, "Conditions for Unique Graph Realizations", *SIAM J. Comput.*, 21 (1992), 6-84.
7. T. Kamada and S. Kawai, "An Algorithm for Drawing General Undirected Graphs", *Information Processing Letters* 31 (1989), 7-15.
8. Y. Koren, "On Spectral Graph Drawing", *Proc. 9th Inter. Computing and Combinatorics Conference* (COCOON'03), LNCS 2697, Springer-Verlag, pp. 496-508, 2003.
9. M. Mauve, J. Widmer and H. Hartenstein. "A Survey on Position-Based Routing in Mobile Ad-Hoc Networks", *IEEE Network*, 15 (2001), 30-39.
10. N. B. Priyantha, H. Balakrishnan, E. Demaine and S. Teller, "Anchor-Free Distributed Localization in Sensor node Networks", *TR #892, MIT LCS*, 2003.
11. M. Tubaishat, S. Madria. "Sensor node Networks: An Overview", *IEEE Potentials*, 22 (2003), 20-23.
12. L. Xiao, S. Boyd. "Fast Linear Iterations for Distributed Averaging", To appear in *Systems and Control Letters*, 2004.
13. Y. Yemini, "Some Theoretical Aspects of Location-Location Problems", *Proc. 20th Annu. IEEE Sympos. Found. Comput. Sci.*, 1979, pp. 1-8.

Thus, certain exemplary embodiments comprise a method, comprising: in a sensor node network comprising a plurality of sensor nodes, each sensor node from the plurality of sensor nodes having location coordinates that are initially unknown, each sensor node from the plurality of sensor nodes having neighbors, each sensor node from the plurality of sensor nodes capable of determining distances only to that sensor node's neighbors: for each sensor node from the plurality of sensor nodes, communicating with that sensor node's neighbors; and based only on communications between neighbors, in a fully distributed manner, generating a sensor node network layout that indicates the location coordinates of each sensor node.

Figure 5:
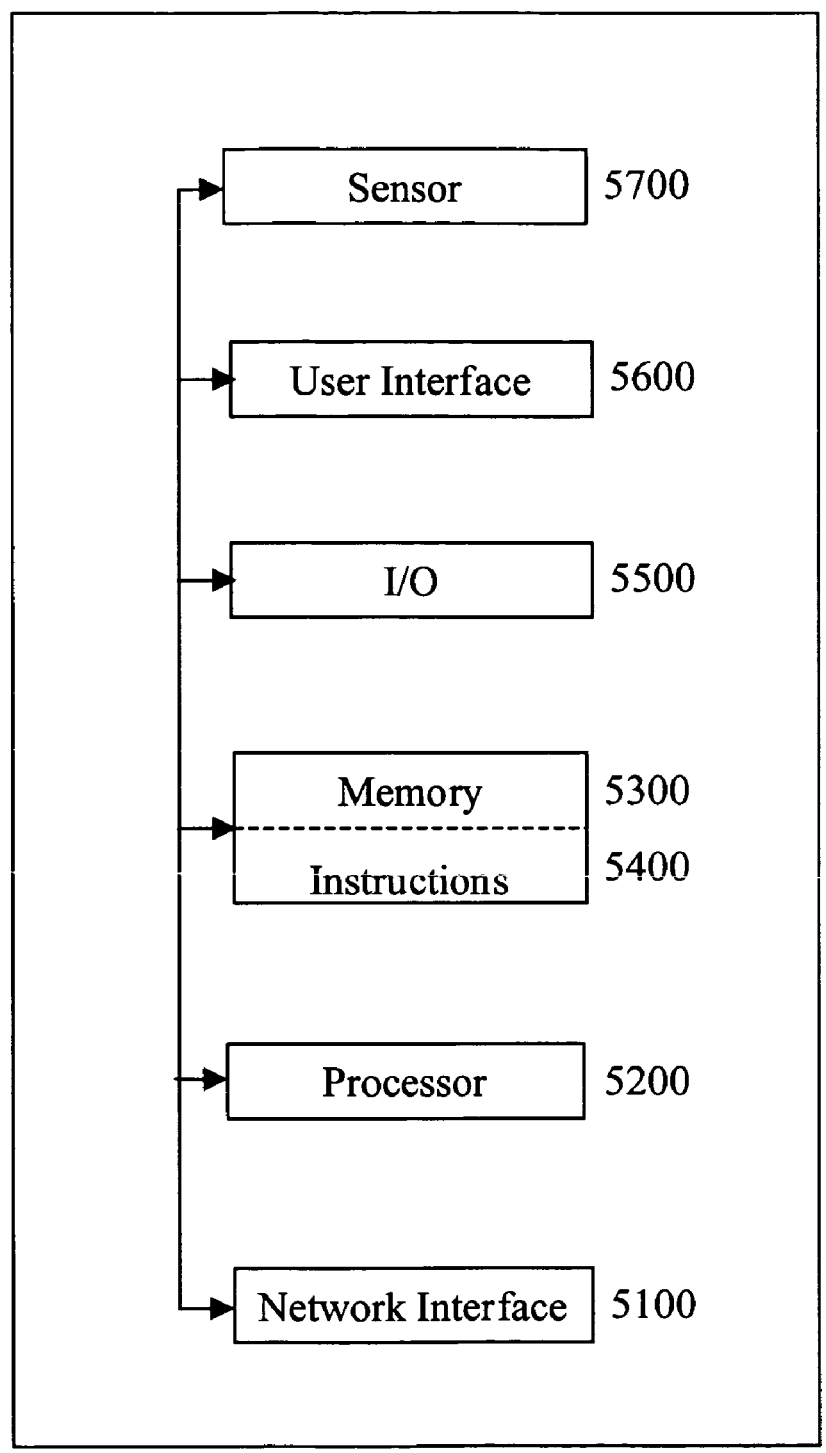
FIG. 5 is a block diagram of an exemplary embodiment of a sensor node 5000.

FIG. 5 is a block diagram of an exemplary embodiment of a sensor node 5000, which can comprise any of numerous well-known components, such as for example, one or more transceivers and/or network interfaces 5100, one or more processors 5200, one or more memories 5300 containing instructions 5400, one or more input/output (I/O) devices 5500, one or more user interfaces 5600, and/or one or more sensors 5700, etc.

In certain exemplary embodiments, via one or more user interfaces 5600, such as a graphical user interface and/or an audible user interface, a user can perceive a rendering of information gathered by one or more sensors 5700. For example, a sensor that has detected a threshold quantity of a predetermined substance can cause an annunciator to sound, a lamp (which can be considered an input/output device and/or a user interface) to glow and/or a screen to display one or more characters, icons, animations, etc.

Figure 6:
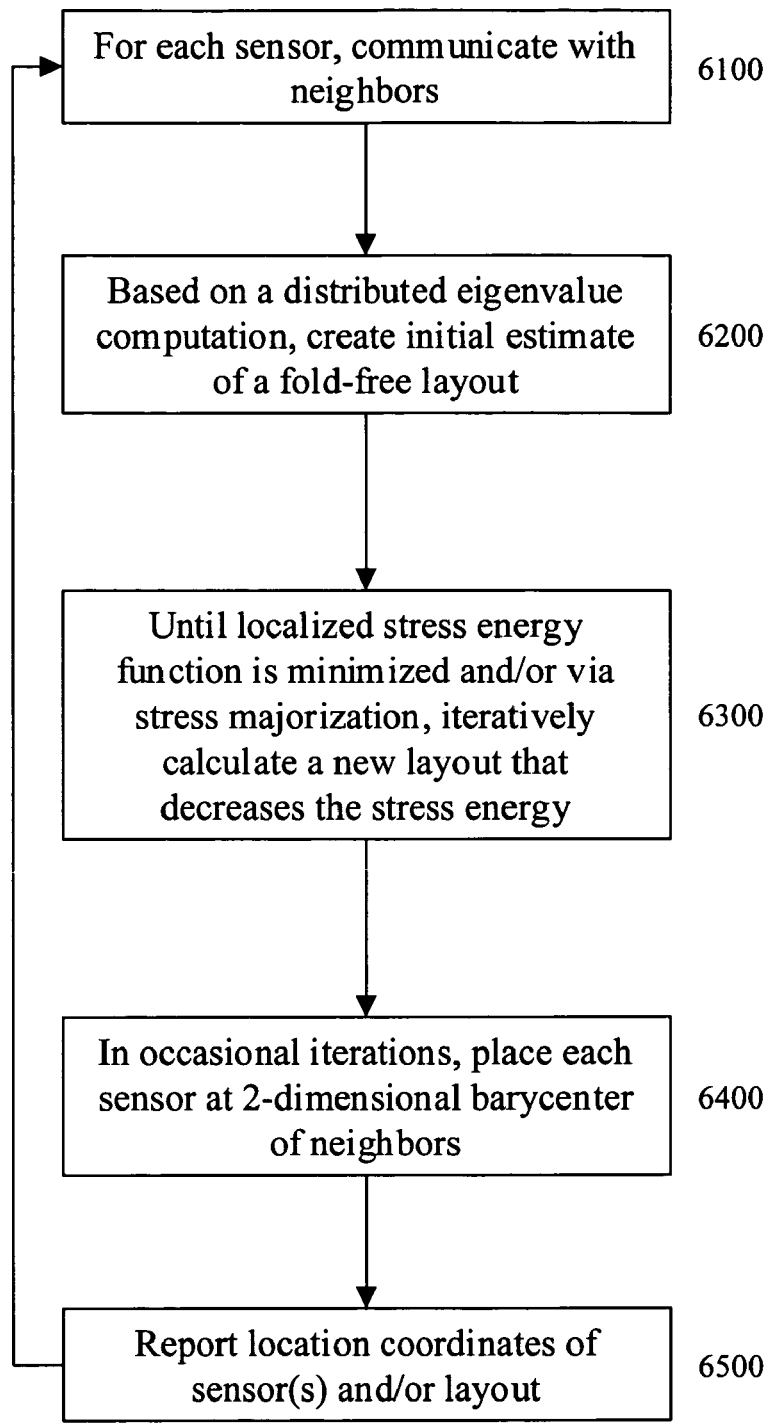
FIG. 6 is a flowchart of an exemplary embodiment of a method 6000.

FIG. 6 is a flowchart of an exemplary embodiment of a method 6000. At activity 6100, each sensor node in a network can communicate with its neighbors. The neighbors with which the communications are held can be its nearest, adjacent, immediate, and/or nearby neighbors. The neighbors with which the communications are held can be neighbors within a predetermined and/or predefined distance of the sensor node.

At activity 6200, based on a distributed eigenvalue computation, an initial estimate of a fold-free layout can be created. This layout can be a starting layout.

At activity 6300, until a localized stress energy function is minimized and/or via stress majorization, iteratively: at least one coordinate can be incremented, and/or a new sensor layout can be calculated in order to decrease the localized stress energy.

At activity 6400, if desired, within occasional iterations of activity 6300, one or more and/or each sensor can be placed at a 2-dimensional barycenter of its nearest, adjacent, immediate, and/or nearby neighbors to potentially improve the accuracy and/or speed the convergence of a final layout.

At activity 6500, location coordinates of one or more sensors and/or the final layout can be provided and/or reported. At this point, method 6000 can repeat for as many repetitions as desired, including eternally.

When the following terms are used herein, the accompanying definitions apply:

adapted to—made suitable or fit for a specific use or situation.

apparatus—an appliance or device for a particular purpose can—is capable of, in at least some embodiments.

communicate—to exchange information.

comprising—including but not limited to.

coordinates—any of a set of two or more numbers used to express the position of a sensor node.

couplable—capable of being joined, connected, and/or linked together.

data—distinct pieces of information, usually formatted in a special or predetermined way and/or organized to express concepts.

determine—ascertain, obtain, and/or calculate.

fold-free—lacking Holdovers in which one or more portions of a layout folds over on top of one or more other portions.

fully distributed—decentralized.

generator—a device adapted to create and/or produce.

input/output (I/O) device—any human sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

instructions—directions adapted to perform a particular operation or function.

inter-sensor node—between neighboring sensor nodes.

layout—a virtual, calculated, and/or imaginary geometric arrangement that, in an optimal configuration, closely approximates, approaches, and/or matches a physical layout.

location—a place where, and/or substantially approximating where, something physically exists.

may—is allowed to, in at least some embodiments.

memory—a device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory can be coupled to a processor and can store instructions adapted to be executed by processor according to an embodiment disclosed herein.

neighbors—two sensor nodes that can communicate and measure the distance between themselves.

network—a communicatively coupled plurality of addressed and/or addressable devices.

network interface—any device, system, or subsystem capable of coupling a sensor node to a network. For example, a network interface can be a telephone, cellular phone, cellular modem, telephone data modem, fax modem, wireless transceiver, ethernet card, cable modem, digital subscriber line interface, bridge, hub, router, or other similar device.

node—an addressed and/or addressable device communicatively coupled to and/or in a network.

optimal sensor node network layout—a virtual geometric arrangement of a network's sensor nodes whereby the distance between each pair of neighbors in the arrangement closely approximates, approaches, and/or matches a physical and measureable distance between those neighbors.

plurality—the state of being plural and/or more than one.

predetermined—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

provide—to make available; to supply; to prepare.

receive—to take or acquire something provided.

sensor—a device used to measure a physical quantity (e.g., temperature, pressure, capacitance, and/or loudness, etc.) and convert that physical quantity into a signal of some kind (e.g., voltage, current, power, etc.). A sensor can be any instrument such as, for example, any instrument measuring pressure, temperature, flow, mass, heat, light, sound, humidity, proximity, position, gap, count, velocity, vibration, voltage, current, capacitance, resistance, inductance, and/or electro-magnetic radiation, etc. Such instruments can comprise, for example, proximity switches, photo sensors, thermocouples, level indicating devices, speed sensors, electrical voltage indicators, electrical current indicators, on/off indicators, and/or flowmeters, etc.

sensor node—an apparatus comprising a sensor, a processor that can execute instructions, and a transceiver that allows the apparatus to communicate with other sensor nodes or with a central processing unit.

substantially—to a great extent or degree.

system—a collection of mechanisms, devices, data, and/or instructions, the collection designed to perform one or more specific functions.

telecommunications—the science and technology of communication at a distance by electronic transmission of impulses.

transceiver—a device capable of transmitting and receiving signals.

transmit—to send.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method, comprising:

in a sensor node network comprising a plurality of sensor nodes, each sensor node from the plurality of sensor nodes having location coordinates that are initially unknown, each sensor node from the plurality of sensor nodes having neighbors, each sensor node from the plurality of sensor nodes capable of determining distances only to that sensor node's neighbors:

for each sensor node from the plurality of sensor nodes, communicating with that sensor node's neighbors;

based only on communications between neighbors, in a fully distributed manner, generating an initial layout, the initial layout determined via iteratively averaging eigenvector values for each predetermined sensor node with eigenvector values for each neighbor of each predetermined sensor node, the eigenvector values determined based upon:

$$x_i \leftarrow a\left(x_i + \frac{\sum_{\langle i,j \rangle \in E} w_{ij} x_j}{\sum_{\langle i,j \rangle \in E} w_{ij}}\right)$$

where:
- i and j are adjacent sensor nodes;
- E is a set of edges of the plurality of sensor nodes;
- $w_{i,j}$ is a measure of a similarity of adjacent sensor nodes;
- $x_j$ is a location coordinate indicative of a relative position of node j; and
- a is a predetermined constant;

utilizing the initial layout, via an iterative technique not involving gradient descent, generating a sensor node network layout that indicates the location coordinates of each sensor node; and rendering the sensor node network layout.

2. The method of claim 1, further comprising:
avoiding communications between non-neighboring sensor nodes.

3. The method of claim 1, further comprising:
minimizing communications between each sensor node and its neighbors.

4. The method of claim 1, further comprising:
avoiding any centralized control of said method.

5. The method of claim 1, wherein:
the generated sensor node network layout is optimal.

6. The method of claim 1, wherein:
the initial layout is fold-free.

7. The method of claim 1, further comprising:
providing the generated sensor node network layout.

8. The method of claim 1, further comprising:
via the iterative technique, minimizing a localized stress energy function.

9. The method of claim 1, wherein:
the iterative technique is fully distributed.

10. The method of claim 1, wherein:
the iterative technique comprises majorization.

11. The method of claim 1, further comprising:
placing each sensor node from the plurality of sensor nodes at a two-dimensional barycenter of that sensor node's neighbors.

12. The method of claim 1, wherein:
the initial layout is based on a distributed eigenvector computation.

13. The method of claim 1, wherein:
the iterative technique comprises performing an eternal process of stress minimization.

14. The method of claim 1, further comprising:
providing the location coordinates of at least one sensor node.

15. The method of claim 1, wherein:
the plurality of location coordinates change dynamically for each of the plurality of sensor nodes.

16. The method of claim 1, wherein:
the sensor node network layout is two-dimensional.

17. The method of claim 1, wherein:
the sensor node network layout is three-dimensional.

18. The method of claim 1, wherein:
at least a portion of the sensor node network layout is located indoors.

19. A system, comprising:

in a sensor node network comprising a plurality of sensor nodes, each sensor node from the plurality of sensor nodes having location coordinates that are initially unknown, each sensor node from the plurality of sensor nodes having neighbors, each sensor node from the plurality of sensor nodes capable of determining distances only to that sensor node's neighbors:

for each sensor node from the plurality of sensor nodes, a transceiver adapted to communicate with that sensor node's neighbors; and a sensor node network layout generator adapted to, based on only communications between neighbors:

in a fully distributed manner and not based on gradient descent, generate an initial layout, the initial layout determined via iteratively averaging eigenvector values for each predetermined sensor node with eigenvector values for each neighbor of each predetermined sensor node, the eigenvector values determined based upon:

$$x_i \leftarrow a\left(x_i + \frac{\sum_{\langle i,j \rangle \in E} w_{ij} x_j}{\sum_{\langle i,j \rangle \in E} w_{ij}}\right)$$

where:
- i and j are adjacent sensor nodes;
- E is a set of edges of the plurality of sensor nodes;
- $w_{i,j}$ is a measure of a similarity of adjacent sensor nodes;
- $x_j$ is a location coordinate indicative of a relative position of node j; and
- a is a predetermined constant; and utilizing the initial layout, via an iterative technique not involving gradient descent, generate a sensor node network layout that indicates the location coordinates of each sensor node.

20. A machine readable medium storing instructions for activities comprising:

in a sensor node network comprising a plurality of sensor nodes, each sensor node from the plurality of sensor nodes having location coordinates that are initially unknown, each sensor node from the plurality of sensor nodes having neighbors, each sensor node from the plurality of sensor nodes capable of determining distances only to that sensor node's neighbors:

for each sensor node from the plurality of sensor nodes, communicating with that sensor node's neighbors; and based on only communications between neighbors, in a fully distributed manner and not based on gradient descent, generating an initial layout, the initial layout determined via iteratively averaging eigenvector values for each predetermined sensor node with eigenvector values for each neighbor of each predetermined sensor node, the eigenvector values determined based upon:

$$x_i \leftarrow a\left(x_i + \frac{\sum_{\langle i,j\rangle \in E} w_{ij}x_j}{\sum_{\langle i,j\rangle \in E} w_{ij}}\right)$$

where;
  i and j are adjacent sensor nodes;
  E is a set of edges of the plurality of sensor nodes;
  $w_{j,i}$ is a measure of a similarity of adjacent sensor nodes;
  $x_j$ is a location coordinate indicative of a relative position of node j; and
  a is a predetermined constant;
utilizing the initial layout, via an iterative technique not involving gradient descent, generating a sensor node network layout that indicates the location coordinates of each sensor node; and
rendering the sensor node network layout.

* * * * *